May 5, 1959
E. G. PICKELS ET AL
2,885,188
CENTRIFUGE APPARATUS
Filed March 14, 1956
2 Sheets-Sheet 1
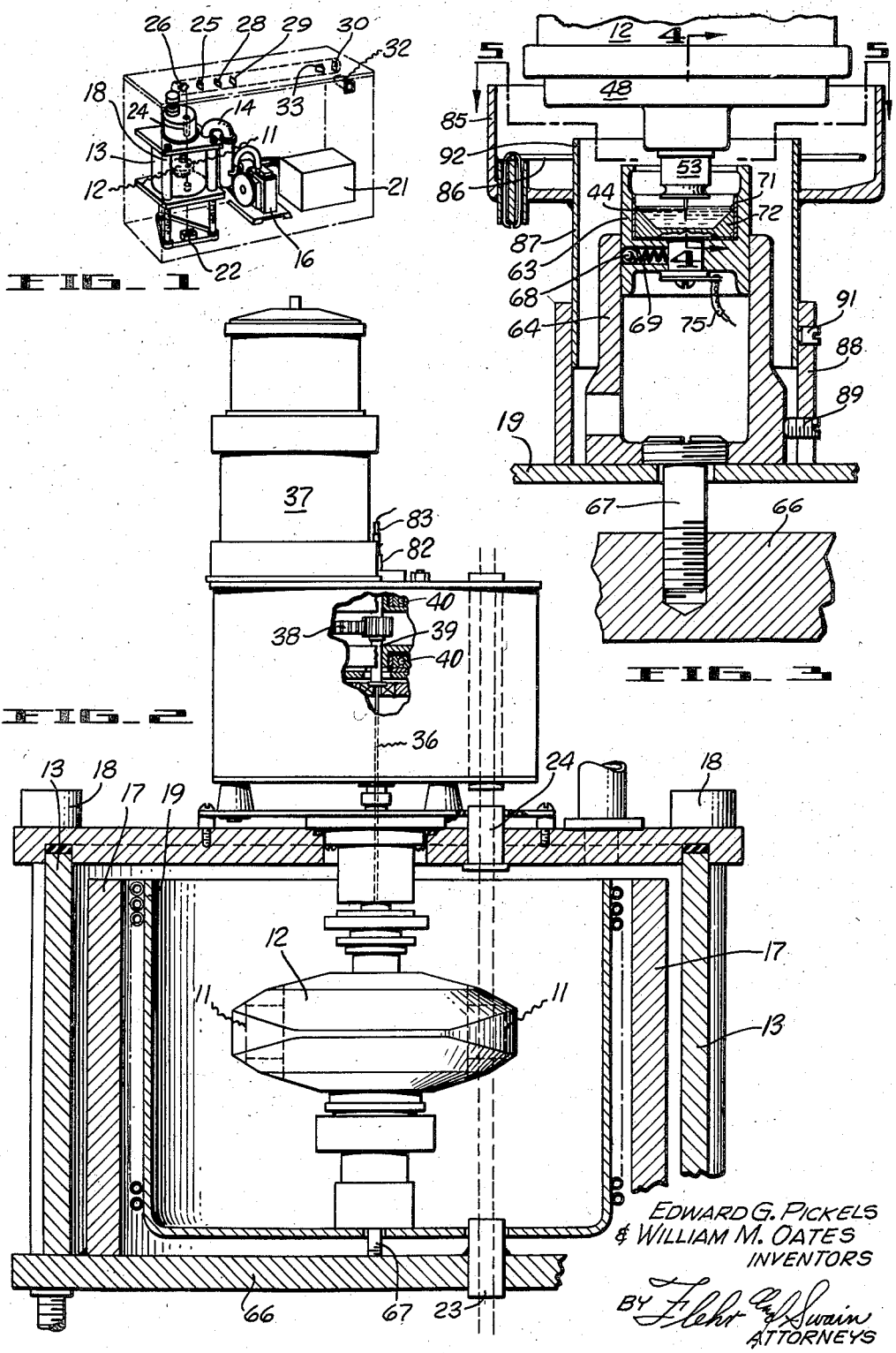
EDWARD G. PICKELS
& WILLIAM M. OATES
INVENTORS
BY
ATTORNEYS

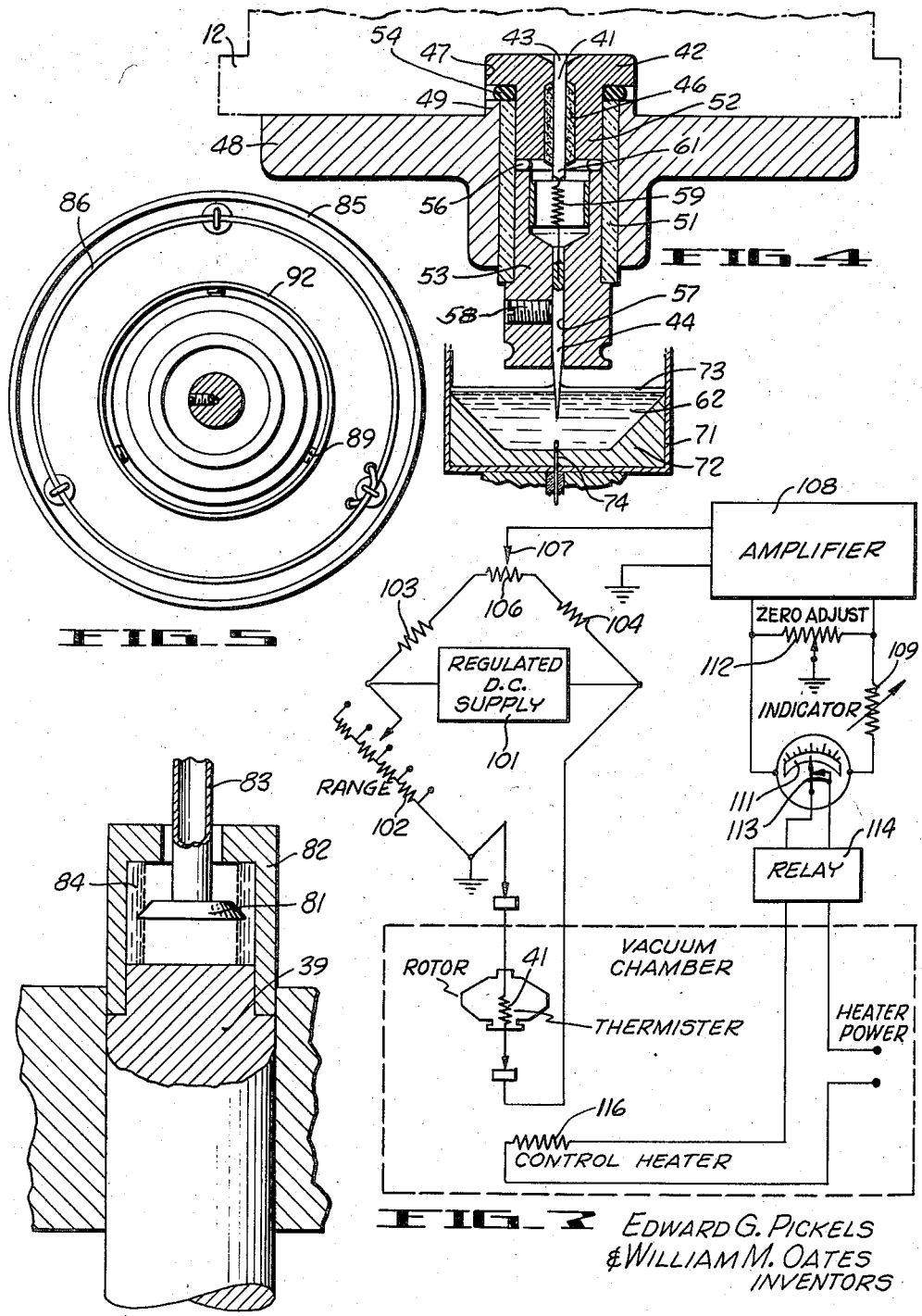

United States Patent Office 2,885,188

Patented May 5, 1959

2,885,188

CENTRIFUGE APPARATUS

Edward G. Pickels, Atherton, and William M. Oates, San Carlos, Calif., assignors to Beckman Instruments, Inc., Fullerton, Calif., a corporation of California Application March 14, 1956, Serial No. 571,449

12 Claims. (Cl. 257—4)

This invention relates generally to centrifuges and more particularly to temperature indicating and control apparatus therefor.

In a gravitational field of force, a particle suspended in a liquid medium of lower specific gravity tends to migrate through the liquid in a downward direction. If the density of the particle is less than that of the liquid, then it tends to migrate upward. The rate of migration is governed by the size, shape and density of a particle, density and viscosity of the suspending medium and the intensity of the gravitational field to which the particle is subjected.

In a dilute suspension of identical particles, sedimentation rates of all particles will be equal. Assuming downward movement of sedimentation, those particles at the surface form a well defined boundary which demarks the sedimenting phase from the liquid. Particles collect at the bottom at a uniform rate as they settle out. The concentration of the suspended particles between the boundary and the bottom remains substantially constant.

The boundary is not sharp because of thermal agitation or brownian movement of the particles. In general, the smaller the particle, the slower the sedimentation rate and the higher the rate at which the boundary diffuses. Sedimentation rates are nevertheless measurable since it is known that the position of the boundary in absence of diffusion is the level at which the concentration of particles is one-half of that in the plateau region.

To produce a measurable sedimentation in the particle size range considerably below one micron, within reasonable time and without excessive diffusion at the boundary, higher gravitational fields are necessary. Through the pioneering work of Svedberg and his collaborators, it has been demonstrated that high centrifugal forces can be utilized for producing measurable sedimentation of molecular particles.

The sedimentation behavior of a substance is generally expressed in terms of its "sedimentation constant" $s$, which is the sedimentation rate (cm./sec.) per unit field of force (dyne/g of mass).

For purposes of comparison, sedimentation constants are generally reduced to values which would be obtained if the medium had the viscosity and density of water at 20° C. Molecular weight may be computed from a knowledge of the sedimentation and diffusion rates, the temperature, and the viscosity. Temperature and viscosity appear in the formula which relates the various constants. Thus, the accuracy with which the molecular weight is obtained is directly dependent upon the accuracy with which the temperature is measured.

A special case which is of very practical use is that in which sedimentation is kept slow enough in comparison to diffusion to prevent formation of any distinguishable boundary. When this situation is continued over a relatively long period of time with the centrifugal force and temperature held constant, a state of equilibrium is established between the diffusion and sedimentation processes. An analysis of the concentration distribution then permits the determination of molecular weight, in accordance with Svedberg's "equilibrium ultracentrifugation method" equation. Molecular weights of less than 100 can be determined.

It is noted that for ultracentrifugation it is necessary to maintain constant speeds over relatively long periods of time and also to maintain constant temperatures. The temperature must not only be constant, but must be accurately known in order to obtain accurate results.

As is well known, rotors of ultracentrifuges are generally operated in an evacuated enclosure to reduce the drag. The rise in temperature due to friction between the rotor and the surrounding air is considerably reduced. This minimizes temperature gradients through the rotor which would set up gradients within the solution. A change in speed of the rotor will cause a change in its equilibrium temperature.

It is desirable to compensate or correct for these temperature changes since they introduce errors in the determination of the sedimentation constant. The evacuated enclosure in which the rotor is mounted is generally refrigerated by means having on-off control. Additional temperature control means are desirable to maintain the rotor at a constant temperature.

Although the temperature of the rotor at a particular instant may be obtained by indirect methods such as measuring the temperature before and after a run and assuming that it varies linearly, it is preferable to obtain the temperature directly. This means that a temperature sensitive element should be mounted on the rotor. In the past, the electrical contacts between the rapidly rotating rotor and the stationary measuring system have been unsatisfactory.

It is an object of the present invention to provide a novel temperature measuring and control system for centrifuges.

It is another object of the present invention to provide novel means for making continuous contact with a temperature sensing element carried by the rotor.

It is a further object to provide means for making electrical contact between a stationary and a rapidly rotating member.

It is a further object of the present invention to provide means for making contact with opposite ends of a temperature sensing element carried by the rotor in which changes in contact resistances are minimized.

It is still a further object of the present invention to provide means for making electrical contact with opposite ends of the temperature sensing element carried by the rotor in which temperature rise due to friction at the contact is minimized.

It is a further object of the present invention to provide means for making electrical contact with opposite ends of a temperature sensing element carried by a rotor in which the rotor may be replaced without requiring time consuming adjustments.

These and other objects of the invention will become more clearly apparent from the following description when taken in conjunction with the accompanying drawings.

Referring to the drawings:

Figure 1 is a schematic diagram of a centrifuge showing the drive means, rotor, refrigerator, vacuum pump, and the optical system for measuring the refractive index;

Figure 2 is an enlarged view in section of a portion of Figure 1 showing the rotor enclosure and the driving means;

Figure 3 is an enlarged sectional view showing the lower contact assembly and heater;

Figure 4 is an enlarged sectional view showing the lower portion of the rotor and the temperature sensing element mounted therein, taken along the line 4—4 of Figure 3;

Figure 5 is a top view of the heater taken along the line 5—5 of Figure 3;

Figure 6 is an enlarged sectional view of the upper contact assembly;

Figure 7 is a schematic diagram of the rotor temperature control and measuring circuit.

Connection is made with the opposite ends of the temperature sensitive element mounted in a rapidly rotating member through suitable contacts. The temperature sensitive element is connected in a bridge circiut which includes an indicating meter and which controls a heater which serves to maintain the temperature of the member constant.

In centrifugation the sample to be analyzed is sealed within a sector shaped cell which fits into an accommodating hole 11, formed in a rotor 12. The rotor spins within a heavy steel chamber 13 which is evacuated by an oil diffusion pump 14 and a backing mechanical pump 16. Added protection against rotor explosion is provided by a thick steel ring 17. Opening, closing, and automatic locking of the vacuum chamber is accomplished through rotation of the three threaded support rods 18.

When the rotor is operated at full speed with a good vacuum, its rate of temperature rise is in a neighborhood of 1° C. per hour with the surroundings at a comparable temperature. Even this rise can be eliminated by adjusting the average temperature of the surroundings about 10°–15° C. below the rotor by cooling the surroundings. Thus, the enveloping cylinder 19 is refrigerated by a compressor unit 21.

For continuously detecting sedimentation boundaries, light from a slit source 22 is paralleled by a collimating lens 23 and directed through the cell 11 within the spinning rotor 12. In the region of the sedimenting boundaries, the light rays suffer deviation which the system is designed to measure. The parallel light is converged by a condensing lens 24 to form an image of the slit source at an inclined slit 25 after reflection from a mirror 26. The light continues through a camera lens 28 and a cylinder lens 29 to give on the photographic plate 30 and on the viewing screen 32 following reflection from a partial mirror 33, a pattern from which the concentration distribution of the material within the cell can be determined. Sedimenting boundaries may also be detected through the absorption of the sedimentating material of specific wavelengths of light according to the methods taught by Svedberg.

The rotor spins in the evacuated chamber about a vertical axis and is flexibly suspended by the shaft 36. The load is carried by mechanical bearings. A suitable electric drive motor 37 drives the main drive gear 38 which in turn drives the drive spindle 39 at high speeds. A flexible shaft 36 is suitably attached to the spindle and serves to drive the rotor. Circumferentially spaced guide rollers 40 surround and engage the rotating spindle 39.

Referring to Figure 4, the temperature sensing element 41, which, for example, may be a rod-shaped thermistor or other resistance elements, is mounted in the lower portion of the rotor 12. As is well known, a thermistor is formed of semi-conductive material and has an unusually high negative resistance temperature coefficient. The temperature sensing element 41 is embedded in a plug 42 which is preferably made of brass or copper and which forms a part of the lower contact assembly. One end 43 of the temperature sensing element is in intimate thermal and electrical contact with the rotor 12. The other end is insulated from the rotor body and is connected by suitable means to a needle or pin 44. For example, the rod-shaped temperature indicating element may be concentric with the plug 42 and suitably cemented therein by cement 46 which serves to insulate the same from the plug. The rotor is provided with an accommodating recess 47. A collar 48 having an annular portion 49 adapted to fit within the recess 47 is secured to the bottom of the rotor. A sleeve 51 formed of insulating material fits within the collar 48 and is adapted to receive the portion 52 of the plug 42 and pin or needle mount 53. The O-ring 54 is interposed between the plug 42 and the collar 49 and insulating member 51 and serves to prevent entrance of moisture which might short the plug to the rotor. The O-ring 56 acts in a similar manner.

The pin or needle 44 is slidably mounted in the accommodating hole 57 and its position along the axis is fixed by means of the set screw 58. The spring 59 interposed between the pin 44 and the end 61 of the thermistor electrically connects the two parts. The end of the needle is adapted to immerse into the mercury pool 62. Preferably, the needle is made of platinum wire or platinum coated metal.

A cup-shaped holder 63 is slidably received within the mounting member 64 which is suitably attached to the base 66 of the apparatus by means of the screw 67. The holder 63 which is slidable within the member 64 is held at desired elevations by means of the frictional engagement of the ball 68 with the inside of the member 64. The spring 69 serves to increase the pressure between the two parts. The vertical adjustment of the member 63 permits accommodation of different sized rotors. The member 63 has its inner surface insulated by means of suitable insulation 71 and a reservoir 72 is placed therein which is filled with mercury.

It is observed that the mercury pool is in contact with the refrigerated enveloping cylinder 19. This pool is maintained at low temperatures where its vapor pressure is low. Also heat transfer by conduction along the needle to the rotor is at a minimum.

Preferably the mercury pool is covered with a thin layer of oil such as silicon oil to prevent evaporation of mercury at the reduced pressures to which it is subjected. The hydrostatic pressure of the oil layer prevents evaporation of the mercury. If the oil layer were not present, the mercury would evaporate and coat the inside of the enclosure. A lead 74 is brought into the mercury pool, passes out through the member 72 through the insulation and is insulated from the member 63. A lead 75, connected to the lead 74, is brought out of the vacuum chamber through the bottom of the enclosure.

As previously described, the end 43 of the temperature sensing device is in intimate contact with the rotor. A continuous circuit is then made through the rotor through the flexible supporting shaft 36 and the spindle 39 to the top of the apparatus. Since this side is grounded, it would appear that a contact could be made to any part of the apparatus to make connection to the side 43 of the temperature sensitive element. It has been found, however, that this is not desirable since the spindle 41 and shaft 36 are supported by bearings and the contact resistance at the bearings varies over a considerable range of values. Thus, contact is made to the shaft 36 by means of a stationary platinum disc 81 which protrudes into a semi-closed cup 82 attached to the upper end of the spindle 39. The cup contains a sufficient amount of mercury to contact the disc both at rest and during operation. The cup is filled through the tubing 83 which supports the contact disc 81. The mercury 84 is shown schematically in the position which it attains at high rotative speeds. At the high rotative speeds the mercury is compacted about the disc making good contact therewith. Any foreign substance is forced to the surface where it does not affect the contact between the mercury and the disc.

As previously described, the rotor temperature is controlled by refrigeration. Fine control is by means of a heater which is controlled by a bridge circuit. Referring to Figures 3 and 5, the heater element 86 is mounted within a cup-shaped holder which is concentric with the lower contact of the mercury pool. The cup-shaped holder is suitably attached to the sleeve 87 which is slidably received by the sleeve or collar 88, held by means of screws 89 to the member 64. The vertical height of the heater may be adjusted by loosening the screw 91 and sliding the sleeve 87 within the collar 88. Thus, the heater may be brought closer to or further away from the rotor to thereby control the heat transfer to the rotor by radiation and conduction. The outer lip of the holder avoids direct radiation upon the surrounding cooling chamber. The extension 92 of the sleeve 87 shields or avoids direct radiation of the temperature sensing means and mercury pool. The leads to the heater are brought out from the base of the enclosure.

The temperature indicating and control circuit is shown schematically in Figure 7. A regulated D.-C. voltage source 101 supplies voltage to the bridge. One arm of the bridge includes the temperature sensitive element 41, and a second arm comprises a plurality of series resistors 102 which serves as a range switch. Two fixed resistors 103 and 104 and portions of a balancing potentiometer 106 make up the other two arms of the bridge. The common junction of the range resistance and temperature sensitive element is grounded, while the variable tap 107 of the balancing potentiometer 106 is connected to the amplifier 108. The amplifier 108 may be any suitable D.-C. amplifier.

The output of the amplifier is applied through a resistor 109 to a meter 111. The potentiometer 112 which is connected across the output lead permits initial balancing of the amplifier. For balancing the amplifier the bridge is effectively disconnected by a switch (not shown).

The bridge is brought into balance by moving the tap 107 of the potentiometer 106 until the meter 111 reads zero. With the bridge in balance, dial readings of the tap position are readily converted to temperature. Any reading other than zero represents an amplified signal due to unbalance of the bridge. The bridge signal amplifier provides overload protection for the meter movements and permits use of the meter as a control element.

The meter includes a control pointer 113 which may be moved along the scale of the meter. By moving the pointer to the center of the scale (by means of a knob, not shown), the indicator and control pointer act as contactors energizing the power relay circuit 114 which controls the application of power to the heater 116.

In operation, the potentiometer 107 and the refrigerator control is set to operate at a desired operating temperature. The rotor is pre-cooled or pre-heated to approximately the desired temperature outside the enclosure. The temperature control unit brings the rotor to the selected temperature and maintains it indefinitely. Temperature control is effective only after the rotor has levelled off at the desired operating speed and temperature. A transient temperature phenomena may be measured with a high degree of precision.

For most applications, the resistance-temperature characteristics of a thermistor are specified very accurately. The nominal resistance, i.e., the resistance at a stated temperature, is held only within broad tolerances. Hence, it becomes necessary to initially calibrate each thermistor-equipped rotor, i.e., establish from experimental points a curve relating rotor temperature to balance dial readings.

A calibration stand with attached leads and a thermometer-well facilitate calibration. The pre-heated or cooled rotor is placed on the stand. A well which is in intimate contact with the rotor is placed in the rotor recess 41 and serves to accommodate a calibrated thermometer. The thermometer is surrounded by water to give good thermal contact. After the temperature has been accurately measured by means of the thermometer, the thermistor assembly is inserted and the balance knob is calibrated.

In operation, the temperature sensitive elements employed have a large nominal resistance. Thus, any variation in contact resistance of the order of several ohms can be tolerated since this is only a small percentage of the total resistance.

Although centrifuge apparatus has been described, it is to be understood that certain features of the invention may be used in other fields. For example, the means employed for making electrical contact to a rapidly rotating member has application to other fields. The invention is only to be limited by the appended claims.

It is seen that we have provided an improved temperature control and measuring apparatus for use with centrifuge apparatus. Novel mercury contacts are employed for making contact with opposite ends of a temperature sensitive element carried by a rapidly rotating member.

We claim:

1. In centrifuge apparatus, a centrifuge rotor, means serving to suspend and drive said rotor, a temperature sensitive element carried by said rotor, an upper rotating contact for making electrical connection to one end of said element comprising a semi-closed cup carried by said drive means, mercury carried by said cup, a stationary disc-shaped member coaxial with the cup and adapted to make contact with the mercury, a lower contact for making electrical connection to the other end of said element, and electrical means for measuring temperature connected through said contacts to the temperature sensitive element.

2. Apparatus as in claim 1 wherein said lower contact comprises a needle electrically connected to the other end of said element carried by the rotor and adapted to rotate therewith, a stationary cup-shaped member disposed below said rotor, and mercury carried by said member, said member being disposed whereby the needle is partly immersed in the mercury.

3. In centrifuge apparatus, a centrifuge rotor, means serving to suspend and drive said rotor, a temperature sensitive element carried by said rotor, an upper rotating contact associated with said drive means for making electrical connection to one end of said element, and a lower rotating contact comprising a needle electrically connected to the other end of said element carried by the rotor and adapted to rotate therewith, a stationary cup-shaped member disposed below said rotor, mercury carried in said member, said member being disposed whereby the lower end of said needle is partly immersed in said mercury, and electrical means for measuring temperature connected through said contacts to the temperature sensitive element.

4. In centrifuge apparatus, a rotor, means serving to suspend and drive said rotor, a temperature sensitive resistance element carried by said rotor, a lower contact means comprising a needle electrically connected to one end of said temperature sensitive resistance element, a mercury bath adapted to immerse the other end of said needle, and means for adjusting the vertical height of said bath, upper rotating contacts serving to make electrical connections to the other end of said temperature sensitive resistance element through the driving means and rotor comprising a semi-closed cup attached to said driving means, a stationary disc extending coaxially into said cup and mercury disposed in said cup and adapted to contact the disc during rotation of said driving means, a bridge circuit including said temperature element in one leg thereof, said bridge serving to indicate the temperature of said temperature sensitive resistance element.

5. Apparatus as in claim 4 wherein said temperature sensitive means comprises a thermistor having one side in intimate contact with said rotor for electrical and thermal connection, and its other end insulated therefrom and adapted to be connected to said needle and lower contact element.

6. Apparatus as in claim 4 together with a heater which is mounted adjacent the bottom of the rotor and concentric with the lower contact, and means associated with said bridge circuit for controlling the same.

7. A contact assembly for making electrical contact to the ends of an element carried by a rapidly rotating member comprising an upper contact including a semi-closed cup adapted to rotate with said member, a stationary disc protruding into said cup, and mercury disposed within said cup and adapted to make continuous contact with said disc, and lower contact means comprising a needle carried by said rotating member, mercury, and a stationary cup-shaped member serving to hold said mercury and disposed to immerse the end portion of the needle therein.

8. In centrifuge apparatus, a rotor, a vacuum chamber for said rotor, a temperature sensitive element carried by said rotor, a lower contact means comprising a needle electrically connected to one end of said temperature sensing means, a mercury bath adapted to immerse the other end of said needle, means for adjusting the vertical height of said bath, a relatively thin layer of low vapor pressure liquid disposed on the surface of said mercury and serving to prevent evaporation of the mercury at the reduced pressure to which it is subjected, upper rotating contact serving to make electrical connection to the other end of said temperature sensitive element through said driving means and rotor, and electrical means for measuring temperature connected through said contacts to the temperature sensitive element.

9. In centrifuge apparatus, a rotor, means serving to suspend and drive said rotor, a temperature sensitive element carried by said rotor, a refrigerated vacuum chamber for said rotor, a lower contact means comprising a needle electrically connected to one end of said temperature sensing means, a mercury bath adapted to immerse the other end of said needle and in thermal contact with said refrigerated chamber whereby the same is maintained at a relatively low temperature, means for adjusting the vertical height of said bath, a layer of low vapor pressure liquid disposed on the surface of said mercury and serving to prevent the evaporation thereof under vacuum, an upper rotating contact serving to make electrical connection to the other end of said temperature sensitive element through the driving means and rotor, and a bridge circuit including the temperature sensitive element in one leg thereof, said bridge serving to indicate the temperature of said rotor.

10. Apparatus as in claim 9 including a heater which is mounted adjacent said rotor, and means associated with said bridge circuit for controlling the power supplied to said heater.

11. Apparatus as in claim 10 wherein said upper contact means comprises a semi-closed cup carried by said drive and suspending means, mercury carried by said cup, and a stationary disc-shaped member coaxial with said cup and adapted to make electrical contact with said mercury.

12. In centrifuge apparatus, a centrifuge rotor, means serving to detachably suspend and drive said rotor, a refrigerated vacuum chamber for said rotor, a temperature sensitive resistance element carried by said rotor, a lower contact means comprising a needle electrically connected to one end of said temperature sensing means, a mercury bath adapted to immerse the other end of said needle, means for adjusting the vertical height of said bath, an oil film placed on the surface of said bath and serving to prevent evaporation of the mercury under vacuum, an upper rotating contact serving to make electrical connection to the other end of the temperature sensitive element through the driving means and rotor comprising a semi-closed cup attached to the said driving means, a stationary disc extending coaxially into said cup and mercury disposed in said cup and adapted to contact the disc, a heater mounted in said vacuum chamber adjacent the bottom of said rotor serving to irradiate said rotor to control the temperature thereof, a bridge circuit including said temperature element in one leg thereof, said bridge circuit serving to indicate the temperature of the temperature sensitive resistance element and to control the power applied to said heater element.

References Cited in the file of this patent

UNITED STATES PATENTS

| 2,114,029 | Perry | Apr. 12, 1938 |
| 2,205,375 | Dyer | June 18, 1940 |
| 2,504,284 | Voight | Apr. 18, 1950 |
| 2,608,344 | Pickels | Aug. 26, 1952 |
| 2,648,636 | Ellis et al. | Aug. 11, 1953 |